UNITED STATES PATENT OFFICE.

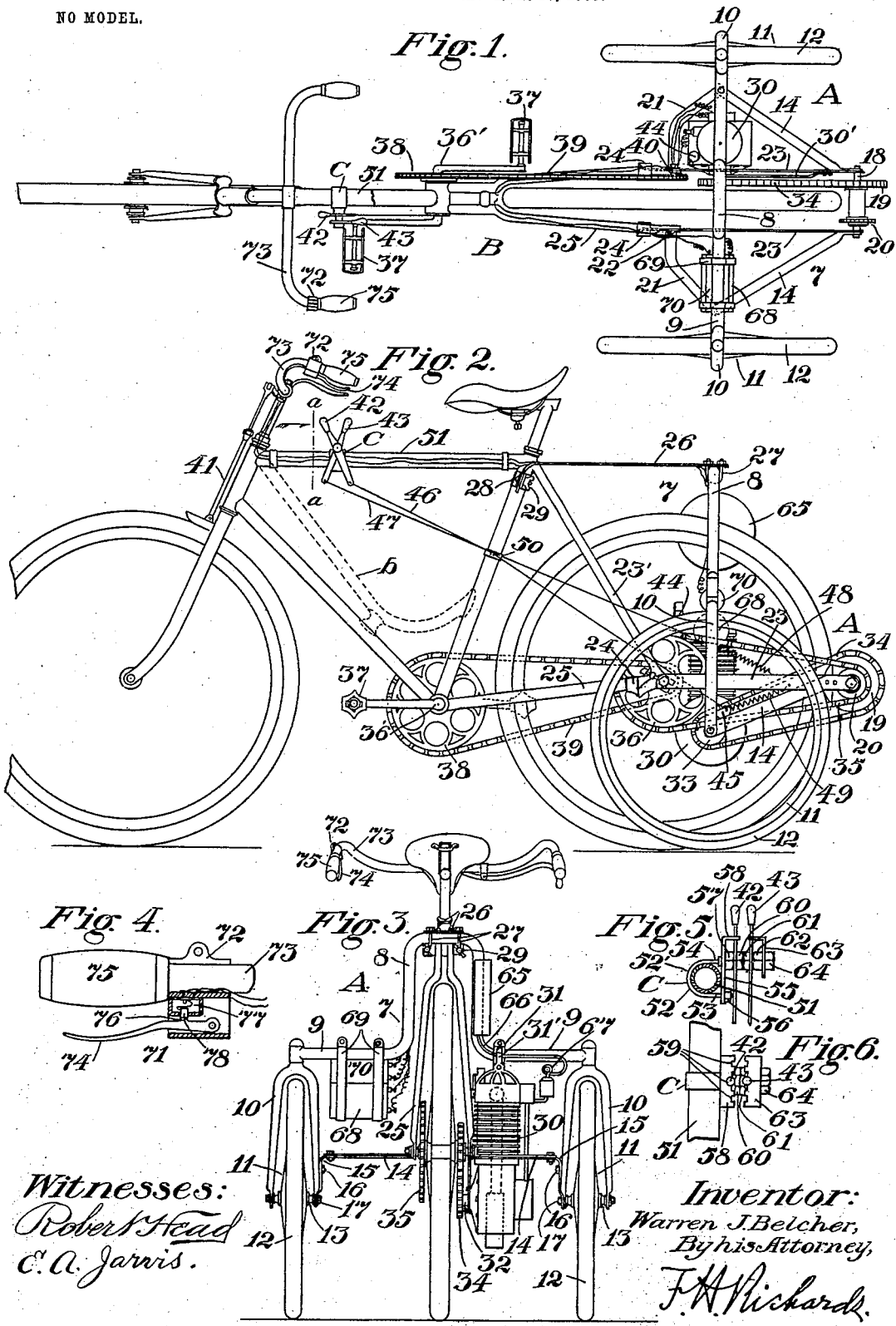

WARREN J. BELCHER, OF HARTFORD, CONNECTICUT, ASSIGNOR OF ONE-HALF TO DEAN E. BELCHER, OF HARTFORD, CONNECTICUT.

BICYCLE MOTOR-TENDER.

SPECIFICATION forming part of Letters Patent No. 725,924, dated April 21, 1903.

Application filed April 17, 1902. Serial No. 103,267. (No model.)

*To all whom it may concern:*

Be it known that I, WARREN J. BELCHER, a citizen of the United States, residing in Hartford, in the county of Hartford and State of Connecticut, have invented certain new and useful Improvements in Bicycle Motor-Tenders, of which the following is a specification.

This invention relates to attachments for bicycles, and has for its object to provide an attachable motor-tender for bicycles and similar vehicles.

Another object of the invention is to provide means whereby a safety-bicycle can be converted into a motor-vehicle.

Another object of the invention is to provide a carriage for supporting the propelling mechanism for a motor-bicycle and in the organization and construction of the carriage.

Another object of the invention is to provide a carriage for receiving the thrust and vibration of a motor for a motor-bicycle.

Another object of the invention is to provide means whereby a motor attachment may be applied to a drop-frame or lady's bicycle without bringing the motor mechanism uncomfortably near the person of the rider.

Another object of the invention is to provide a motor-bicycle wherein one wheel or set of wheels will sustain the weight of the rider and another wheel or set of wheels will sustain the weight of the motor and its accoutrements.

Another object of the invention is to provide a motor-bicycle with means for sustaining the weight and shocks of the motor and maintaining the balance of the bicycle.

Another object of the invention is to provide a carriage for supporting the weight of the motor and its accessories independently of the vehicle propelled thereby and for sustaining the shocks of vibration, thrust, pounding, and jarring of the motor.

In carrying out my invention I employ an independent and complete wheeled motor carrier or conveyance, a vehicle or carriage in the nature of a tender, and having its own independent running-gear, upon which tender may be supported and conveyed any convenient form of motor, which, if desired, may be a gasolene-motor, in which instance the supply-tanks therefor will also be located upon the frame of the carriage, as will also be the battery and spark-coils. The tender may be conveniently attached to the bicycle by means of resilient braces or stays, whereby the carriage will support or sustain the weight of the motor and its accoutrements and will receive all shock and vibration from the operation of the motor, and by means of the resiliency of the attaching-stays the shock will not be communicated to the bicycle or its rider. By this means it will be possible to take an existing or some suitable form of velocipede—as, for instance, the common form of safety-bicycle—and apply the motor attachment thereto. The carriage taking up, as it does, all vibration and shock and sustaining the weight of the propelling mechanism, the bicycle proper will not be racked by the thrust and pounding and incident vibration of the motor, and the frame and wheels of the bicycle will also be relieved from bearing the additional weight of the propelling mechanism, as is the case with existing forms of motor-bicycles.

It is possible with my form of carriage or tender to apply the same not only to a diamond frame, but also to a drop-frame or lady's bicycle. Heretofore in ladies' motor-bicycles it has been proposed to mount the motor mechanism under the saddle; but it is not expedient so to do, for the reason that it is personally uncomfortable if a steam or explosion engine is employed and for the further reason that the presence of the bulky apparatus is inconvenient. Jarring, as heretofore referred to, will be communicated from the propelling mechanism to the rider, and the bicycle will have to carry the additional weight of the motor.

The braces or stays for attaching the carriage or tender to the bicycle-frame may be so organized as to permit a certain amount of rotation of the carriage relatively to the bicycle incident to the tender-wheels going over unevennesses in the road; also to permit a certain amount of vertical motion of the bicycle and tender relative to each other, and also a certain amount of sidewise movement, so that in whatever direction the tender is given slight movements those movements will not be imparted to the bicycle, but will be compensated by the resiliency of the stays.

In the drawings accompanying and forming part of this specification a form of my invention is shown as applied to a common form of safety-bicycle, wherein—

Figure 1 is a top view, partly broken away. Fig. 2 is a side view. Fig. 3 is a rear end view. Fig. 4 is a detail of a portion of a handle-bar, showing the hand-grasp and a form of circuit-closer. Fig. 5 is a view on the line $a\ a$ of Fig. 2 looking in the direction of the arrow, showing the levers for controlling the motor; and Fig. 6 is a top view of Fig. 5.

The tender-carriage or motor-carriage (designated in a general way by A) is shown as comprising a frame 7, consisting of an arched or U-shaped central portion 8, having laterally-projecting side arms 9, to each of which is shown secured in any suitable manner a wheel-fork 10, in which are mounted wheels 11, having pneumatic tires 12, the wheels being mounted in the forks by means of any suitable or convenient form of axles 13. Secured to each fork is shown a stay 14, made of flat metal, which may be resilient, being bent at 15 against the fork and secured by means of a bolt 16 and a nut 17 upon axle 13 of the wheel 11. These stays pass back toward the rear of the tender and form bearings for a counter-shaft 18, upon which two sprocket-wheels 19 and 20 are secured. Secured to each of the stays 14 near the forks is a brace or stay 21, which may also be made of flat or resilient material, but projects forwardly of the tender and is designed for securement to the rear axle of a bicycle, (designated in a general way by B,) the stays 21 in the present instance being interposed between the axle-nuts 22 and the rear forks 23' of the bicycle. In practice it may be desirable to make the stays 14 and 21 flat on a horizontal plane. Between the stays 14 and the bearing of the counter-shaft are interposed stays 23 23, which in practice may be resilient upon a horizontal plane. The stays 23 23 are shown as being secured by the rear-axle nuts 22 alongside of the ends of the stays 21 and each as being bent over, forming hooks 24 to engage the upper part of the rear fork 25 of the bicycle. The top of the frame of the carriage may also be provided with a pair of resilient stays which in practice may be resilient in a vertical plane, which stays in the present instance are shown as embodying flat pieces of metal 26, secured to the frame of the carriage by clips 27 and as secured to the frame of the bicycle by means of a clip 28 and thumb-screws 29.

The device for supplying the motive power in the present instance is shown as a gasolene-engine (designated in a general way by 30) and as suspended by means of a clip 31 to one of the arms of the frame of the carriage. The engine is shown as provided with a shaft 32, having a sprocket-wheel 33 thereon, over which and the sprocket-wheel 19 on the counter-shaft 18 there passes a chain 34. From the other wheel, 20, on the counter-shaft a sprocket-chain 35 passes to a sprocket-wheel 36 upon the rear axle of the bicycle. The load of the engine may be taken up by a strut 30', shown as connected to the engine-casing and one of the backstays.

The bicycle may be, as shown in the drawings, provided with its own propelling-gear, illustrated as a chain-gear comprising a crank 36', pedals 37, and sprocket-wheel 38, over which a chain 39 passes to a sprocket-wheel 40 upon the rear axle. Suitable friction or clutch mechanism may be interposed between the pedals and the rear axle—as, for instance, a coaster-brake—whereby the feet of the rider may remain at rest upon the pedals or not, as he desires. A coaster-brake may be employed to provide convenient means for applying slackening friction to the wheel. The bicycle, however, is shown as provided with a hand-brake 41.

For the purpose of controlling the engine there are shown two levers 42 43, communicating, respectively, with the compression-valve 44 and speed-controlling device 45 of the engine by means of wires 46 47. Rods, of course, could be employed, if desired; but for the sake of lightness I prefer to use wire, as illustrated. Springs 48 49 may be employed for returning the parts to their normal position. A strap 50 may be employed for guiding the wires past the frame of the bicycle and supporting them at their centers. The levers are shown as fastened to the backbone 51 of the bicycle by means of a clamp C, comprising a bent rod 52, having a longer and a shorter end or arm 53 54, respectively, the bent portion 52' encircling the backbone of the bicycle and being held in place by means of a yoke 55 and nuts 56 57. The yoke is shown as provided with an upwardly-projecting bent-over portion 58, provided with teeth or notches 59 for holding the lever 42 in its adjusted position. The lever 42 is held upon the longer arm by means of jam-nuts 60 61. The lever 43 is also secured upon the arm against the jam-nut 61 by means of a jam-nut 62. A notched rack 63 is also provided for the lever 43, which is held between the jam-nut 62 by a jam-nut 64. By the present construction when the two levers are in the position indicated in Fig. 6 the engine will be at rest and in the position of Fig. 2 in operative position. The utility of this organization is such that the operator may bring both levers together by means of one hand, it being more important that rapidity of motion should be had on the shutting off of the engine than in starting it or getting up speed.

The gasolene or other fluid is shown as being supplied from a tank 65 to the engine by means of a pipe 66, which may have a bend or coil 67 therein, whereby the joggling or vibration of the engine will not be imparted to the gasolene-tank through the pipe and the pipe will not be twisted or broken. The pipe may pass under the clip 31, and an arch 31' may be provided in the clip for its accommodation.

In the present form of motor shown electric sparks are to be utilized for igniting the gas, for which purpose a suitable electric battery 68 may be employed, which is shown as secured by means of metal straps 69 on one of the side arms 9 of the carriage-frame. Secured by the same straps is also shown the spark-coil 70, which battery and coil are shown as connected up in an electric circuit with the engine and with a circuit-breaker, (designated in a general way by 71,) which is shown as comprising a clamp 72, secured to the handle-bar 73 of the bicycle, which clamp carries a hand-lever 74, disposed below the grip 75 of the handle-bar and which comprises a contact-point 76, connected to one wire, and a spring contact-piece 77, connected to the other wire, which spring contact-piece is located upon a lug 78 of the lever, and upon compression of the lever by the fingers of the operator the circuit will be closed. Upon releasing the lever the spring will force the same down and break the circuit.

The organization of the circuit shown is such that upon the rider releasing his hand from the handle-bar the explosions will immediately cease in the engine. This is for the purpose of safety, whereby if the rider is thrown or any accident happens to him the explosions will immediately cease. This not only prevents further accidents, but prevents the machine running away in case the rider is thrown, or while the machine is remaining standing in a public place prevents mischievous persons from starting the same and permitting it to run away, it being necessary at all times for the hand to maintain the lever pressed against the grip for the motor to be in an operative state.

The organization of the two carriages (in the present instance the bicycle and tender) is such that the traction-wheel, which in the present instance is the rear bicycle-wheel, is not raised from the ground by the motor-carriage. Upon the rider assuming the saddle the tread of the bicycle-tire will be somewhat deflated, holding it in engagement with the road-bed for purposes of traction and permitting the carriage-wheels to support the entire weight of the motor and tender. Thus it will be seen that the bicycle-wheels carry the rider, supporting and sustaining him and his weight and the weight of the bicycle, and the carriage-wheels sustain the weight of the carriage and the motor, whereby a tender is provided which carries the motor and its appurtenances without throwing any additional weight or strain upon the bicycle wheels or frame, and the connections are such that the thrust and pounding of the engine and the vibration incident to its running are not communicated to the bicycle or rider.

In Fig. 2 the tender is shown as applied to a diamond-frame bicycle; but in dotted lines at $b$ is shown the frame of a lady's wheel or drop-frame bicycle, showing that it is possible to attach this form of motor to existing styles of ladies' wheels.

When it is desired to remove the attachment from the bicycle, it is simply necessary to remove the nuts 22 of the rear axle and slip the stays 21 and 23 from off the axle, replacing the nuts, removing the chain 35 from the sprocket-wheel 36, and unclamping the spring-stays 26 from the bicycle-frame and removing the clamp C, carrying the controlling-levers, from the frame of the bicycle. Then the bicycle will be in all respects as a common form of bicycle, with the exception of one idle sprocket-wheel 36 upon the rear axle. If, however, it is desired, an extra rear wheel may be employed, in which instance the rear wheel of the bicycle will be removed with the carriage and will become part of the carriage to a certain extent and will aid in maintaining it in an upright position when removed from the bicycle, after which the extra wheel may be placed in the frame of the bicycle.

Having described my invention, what I claim, and desire to secure by Letters Patent, is—

1. In a motor-velocipede, the combination with a velocipede having its own running-gear, of a motor; a tender-carriage therefor having its own running-gear; and resilient connecting means, normally constituted for disconnection, attached to the tender-carriage and to the velocipede.

2. In a motor-bicycle, the combination with a safety-bicycle for supporting a rider and embodying a complement of wheels, of a tender-carriage for supporting a motor and embracing a complement of two wheels; and a plurality of spring-stays yieldable in transverse planes, connected to the tender-carriage and attached to the frame of the bicycle.

3. In a motor-bicycle, the combination with a complete bicycle having its own independent running-gear, of a motor for propelling the same; an independent, complete conveyance-vehicle for the motor and comprising a frame; an independent running-gear to straddle the rear wheel of the bicycle; and spring-stays connected to said frame and to the bicycle-frame, for attaching together for purposes of connection only, the complete bicycle and the independent, complete wheeled conveyance-vehicle without the encroachment of either upon the independence of the running-gear of the other.

4. The combination with a safety-bicycle embodying a frame and wheels, of a motor for propelling the same; a frame for supporting the motor; wheels mounted in the frame, the frame and wheels straddling one of the wheels of the bicycle; and yieldable stays connecting said frames.

5. In a tender attachment for bicycles, the combination of a frame; wheel-supporting members carried thereby and capable of straddling a bicycle-wheel; stays connected to the frame; and stays connected to the wheel-supporting members, all said stays adapted to attach the tender-frame to a bicycle-frame.

6. The combination with a bicycle embodying a traction-wheel, of a motor for actuating the traction-wheel; means for connecting the motor and wheel; a carriage for supporting the motor; backstays between the axle of the wheel and a part of the motor mechanism yieldable laterally; and stays between the frame of the carriage and the frame of the bicycle yieldable in a plane transverse to the yieldability of the backstays.

7. The combination with a bicycle embodying a frame; an axle mounted in the frame of the bicycle; a traction-wheel journaled on the axle; a motor for actuating the wheel; means for connecting the motor to the wheel embodying a counter-shaft; means for supporting the counter-shaft embodying backstays secured to the axle of the bicycle and affording bearings for the counter-shaft, said backstays being yieldable laterally; stays connected to the frame of the carriage and yieldable in a plane transverse to the yieldability of the backstays and secured to the backstays at or near their points of connection to the bicycle-frame and the counter-shaft bearing.

8. An attachment for bicycles comprising a frame; a pair of wheels mounted in the frame; motor mechanism suspended from the frame; a counter-shaft; yieldable braces supporting the shaft; and yieldable braces carrying clamps adapted for attaching the device to a bicycle.

9. A frame for a tender attachment comprising a U-shaped central portion; laterally-projecting side arms; and downwardly-projecting forks.

10. A tender for a bicycle comprising a frame embodying a central arched portion; laterally-projecting side arms; forks depending from the arms; wheels mounted in the forks; braces secured to the forks at or near the axles of the wheels and projecting forwardly and rearwardly; an engine suspended from one of the side arms; accessories for the engine suspended to the other of the side arms; a reservoir secured to the arched portion; a counter-shaft for the engine; backstays secured to the rearwardly-projecting stays and affording a bearing for the counter-shaft and joining at their other ends the forwardly-projecting stays and provided at such ends with means for attaching the backstays to the axle and rear fork of a bicycle; and stays secured to the summit of the arch and provided with clamps for attachment to a portion of the frame of a bicycle.

11. A tender for a bicycle comprising a frame embodying a central arched portion; laterally-projecting side arms; forks depending from the arms; wheels mounted in the forks; braces secured to the forks at or near the axles of the wheels and projecting forwardly and rearwardly; an engine suspended from one of the side arms; a counter-shaft for the engine; backstays secured to the rearwardly-projecting stays and affording a bearing for the counter-shaft and joining at their other ends the forwardly-projecting stays and provided at such ends with means for attaching the backstays to the axle and rear fork of a bicycle; means interposed between the engine and counter-shaft for taking the load of the engine; and stays secured to the summit of the arch and provided with clamps for attachment to a portion of the frame of a bicycle.

12. In a motor-vehicle embodying a motor, the combination with a pair of levers for controlling the motor; a bracket for attaching the levers to the frame of the bicycle and comprising a pair of arms connected by an arched portion; a yoke secured to one of the arms and rotatable thereon; means for clamping a portion of the frame of a bicycle between the arch and the yoke, the other arm of said bracket constituting a pivot for the levers; and a pair of racks carried by the arm for holding the levers in their adjusted position.

13. A bracket for supporting controlling-levers comprising a pair of arms of different lengths connected by a bend; a yoke rotatable upon the longer arm and provided with an opening for embracing the shorter arm; a nut upon the shorter arm for securing the yoke in place and clamping it upon the frame; a rack upon the yoke for maintaining one of the levers in its adjusted position; a jam-nut upon the longer arm for holding the yoke in place; a rack for maintaining the other of the levers in its adjusted position mounted upon the longer arm and facing the rack upon the yoke; a pair of levers mounted between the racks; a jam-nut between each of the levers and its respective rack; a pair of jam-nuts between the levers; and a jam-nut upon the arm past the rack.

WARREN J. BELCHER.

Witnesses:
CHAS. LYON RUSSELL,
HENRY BISSELL.